Patented Apr. 11, 1939

2,154,220

UNITED STATES PATENT OFFICE 2,154,220

PROCESS FOR PRODUCING COATINGS ON PLASTER OR OTHER SURFACES

Kurt Sponsel, Wiesbaden-Biebrich, Germany, assignor to Kalle & Co. Aktiengesellschaft, Wiesbaden-Biebrich, Germany No Drawing. Application September 15, 1937, Serial No. 163,919. In Germany September 26, 1936

5 Claims. (Cl. 91—68)

The present invention relates to coatings.

The processes known for producing coatings fast to water on walls, plaster or other similar surfaces suffer from several disadvantages. Frequently a coating obtained has insufficient elasticity, so that it has a tendency to crack. Moreover in general organic solvents are required. Apart from the high price of these solvents, the operator is liable to suffer in health.

One object of this invention is a process which yields coatings of pronounced and durable fastness to washing which do not show the above disadvantages. According to the invention, to the surface to be coated is applied an aqueous solution of a water-soluble salt of a cellulose-ether-carboxylic acid which may contain filling materials, pigments or the like, and this coating is subsequently treated preferably after drying with a solution of a metal salt having a cation that forms an insoluble salt with the acid of the coating. As such salts there come into consideration the salts of the earth metals, in the first place aluminium salts. Besides aluminium salts titanium salts have also proved of particular value. It is possible to obtain similar results by the aid of zinc salts. In general colored metal salts are less suitable. It is surprising that this after-treatment makes insoluble in water the water-soluble film at first obtained without destroying the continuity of the film and affecting its mechanical properties.

As cellulose ether-carboxylic acid preferably cellulose-glycolic acids may be used. One may also use derivatives of cellulose-glycolic acids which contain for example methyl- or oxy-ethyl-groups. Also the homologues of the cellulose-glycolic acids come into consideration, that is to say products which are obtained when chloro-propionic acid or the like instead of chloro-acetic acid is caused to react with alkalicellulose.

The water-soluble salt of a cellulose ether carboxylic acids used should be degraded as little as possible, so that they may form films of high elasticity and of good tenacity.

If a good insulation of the surface to be coated is desired, the surface may be first painted with the metal salt and then with the coating material containing a water-soluble salt of a cellulose ether carboxylic acid. For producing a satisfactory coating fast to washing, however, this coating of a water-soluble salt of a cellulose ether carboxylic acid must still be after-treated with a solution of a metallic salt.

The following example illustrates the invention:

A suspension of chalk or ochre in an aqueous solution of about 4 per cent strength of sodium cellulose-glycolate or the corresponding potassium salt is applied to a porous wall. When the coating is dry it is sprayed with a solution of the aluminium sulphate or alum of 5–10 per cent strength; it is then advantageously subjected to a short treatment with water, for example by application of a damped sponge, in order to remove the sodium sulphate which has been produced, and is finally allowed to dry. When dry, the coating can easily be washed. The cellulose-glycolic acid used may contain about 0.4–0.8 mol of the glycolic acid residue to 1 mol of cellulose ($C_6H_{10}O_5$). Instead of the salts of cellulose-glycolic acid named there may be used, for example, a water-soluble salt of methyl-cellulose-glycolic acid, for instance the sodium salt. In this case there may be used a methyl-cellulose-glycolic acid containing per 1 mol of cellulose ($C_6H_{10}O_5$) about 0.4–0.8 mol of the glycolic acid residue and about 0.1–0.5 mol of methoxyl. Instead of the said aluminium sulphate solution for example a solution of titanyl sulphate ($TiOSO_4$) may be employed.

I claim:

1. A process for producing coatings on walls, plaster, cements and other similar surfaces, comprising coating the support with an aqueous solution containing a water-soluble salt of a cellulose ether carboxylic acid and after-treating the obtained coating with a solution of a metal salt having a cation capable of forming a water-insoluble salt with the acid in the coating.

2. A process as claimed in claim 1, wherein the metal salt used is a metal salt selected from the group consisting of the aluminium salts and the titanium salts.

3. A process for producing coatings on walls, plaster, cements and other similar surfaces, comprising coating the support with an aqueous solution containing a water-soluble salt of a cellulose-glycolic acid and after-treating the obtained coating with an aqueous solution of an aluminium salt.

4. A process for producing coatings on walls, plaster, cements and other similar surfaces, comprising coating the support with an aqueous solution containing a water-soluble salt of a cellulose ether carboxylic acid, drying this coating, and after-treating the obtained coating with a solution of a metal salt having a cation capable of forming a water-insoluble salt with the acid in the coating.

5. A process for producing coatings on walls, plaster, cements and other similar surfaces, comprising coating the support with an aqueous solution containing a water-soluble salt of a cellulose-glycolic acid, drying this coating, and after-treating the obtained coating with an aqueous solution of an aluminium salt.

KURT SPONSEL.